United States Patent [19]
Rucinski

[11] 3,756,325
[45] Sept. 4, 1973

[54] SLIP CLUTCH
[75] Inventor: Roland R. Rucinski, Hanover Park, Ill.
[73] Assignee: Bell & Howell, Chicago, Ill.
[22] Filed: Nov. 1, 1971
[21] Appl. No.: 194,356

[52] U.S. Cl............ 192/70.14, 192/70.11, 64/30 R
[51] Int. Cl.............................................. F16d 13/00
[58] Field of Search..................... 192/66, 56, 70.11, 192/70.14; 64/28 R, 30 R, 30 A, 30 LB, 31

[56] References Cited
UNITED STATES PATENTS
2,039,590 5/1936 Freeborn ......................... 192/70.11
3,330,391 7/1967 Mano............................... 192/70.14
FOREIGN PATENTS OR APPLICATIONS
289,123 10/1931 Italy................................ 192/70.11

Primary Examiner—Charles J. Myhre
Assistant Examiner—Randall Heald
Attorney—James F. Coffee, John R. Hoffman et al.

[57] ABSTRACT

A slip clutch mechanism which includes a rotatable input shaft having a friction clutching surface extending generally transversely thereof, and a rotatable output shaft having a complementary friction clutching surface extending generally transversely thereof facing and in constant engagement with the friction surface on the input shaft. The shafts are mounted for rotation about offset axes whereby the engaging friction surfaces are in constant motion relative to one another not only when the torque limit of the clutch has been reached but during the torque transmitting condition of the clutch. Accordingly, the torque transmitting capability of the clutch is independent of the static coefficient of friction between the clutch surfaces and is a function only of the dynamic coefficient of friction.

3 Claims, 4 Drawing Figures

PATENTED SEP 4 1973  3,756,325

SLIP CLUTCH

BACKGROUND AND SUMMARY OF THE INVENTION

This invention relates to a slip clutch mechanism and more particularly to a friction type slip clutch capable of preventing the transmission of excessive torque where such torque may be detrimental to related apparatus.

Temporary or unexpected surges of power frequently create excessive torque within a drive means. Drive means not having the design capabilities to handle such loads without a clutching means frequently fail, generally at its weakest point, and possibly render the entire apparatus inoperable. Slip clutch oftentimes are used to relieve the drive means and prevent breakage.

Additionally, in certain instances slip clutches are utilized where there simply may be a differential in speed between a pair of driving members in a chain. For instance, in photographic equipment wherein a strip of film is wound about the core of a magazine and also about a capstan associated with the film strip, either or both the core and the capstan may be driven by a single motor. The speed of the strip is determined by the tangential velocity of the capstan which is constant but the speed of the core will vary in accordance with the diameter of the film winding from the center of the core. Therefore, a suitable slip clutch oftentimes is disposed between the motor and the core of the magazine to allow the core to wind or rewind to rotate at a speed controlled by the linear velocity of the strip and the tangential velocity of the capstan. In other words, the slip clutch compensates for differing tangential velocities applied to the strip by the capstan and the core.

In certain apparatus, for instance, the photographic equipment of the type described above, it would be desirable to have a slip clutch mechanism wherein the output torque of the clutch is constant, regardless of whether or not the clutch is slipping. This invention is directed to providing such a slip clutch mechanism.

Heretofore, a simple disc-type slip clutch design has been in wide use and comprises a pair of facing discs which have engaging friction surfaces. The discs are fixed to adjacent ends of driving or driven shafts in the drive chain, the shafts having coincidental axes of rotation. The engagement of the friction surfaces couple the shafts together in driving end to end relationship. The clutching or torque limit is dependent on the static coefficients of friction of the two engaging friction surfaces. With such conventional disc-type slip clutches, constant torque (i.e., whether or not the clutch is slipping) can be achieved only by selecting materials for the friction surfaces which have static and dynamic coefficients of friction as close to equal as possible. Heretofore this has been very difficult because of the limited selection of materials and/or combinations of materials which have substantially equal static and dynamic coefficients of friction.

The present invention contemplates the utilization of generally similar components as the conventional friction type slip clutch described above. However, the input and output shafts are mounted so that their center lines or axes of rotation are offset. The friction clutching surface or disc on one of the shafts is increased in size in order to maintain full face contact with the friction clutching surface or disc on the other shaft. With such a structure, even under synchronous drive conditions, that is the condition where both the input shaft and the output shaft are rotating at the same speed and there is no "slip in the clutch," there is nonetheless rotational and dynamic movement between the input and output friction clutching surfaces. In point of fact for the condition where both the input shafts are in rotation, there is at any one time but a single point at the interface between the clutching surfaces that does not display any sensation of relative speed. That point is on a line defined by intersection of the interface and a plane defined by the axes of the shafts. The point moves on that line dependent upon the "slip in the clutch." All other areas common to the two clutching surfaces at the interface are in relative motion so that only dynamic conditions between the interface need be considered in arriving at desired torque limits of the clutch. Thus the torque output of the clutch is a function of the dynamic coefficient of friction between the abutting friction surfaces and independent of the static coefficient of friction. Additionally, as the torque output is a function of the dynamic coefficient of friction, the torque characteristic of the clutch can be changed by changing the amount of eccentricity between the axes. By making that eccentricity between the axes adjustable, the clutch can be made to deliver an infinitely variable torque, within limits as required.

In view of the invention, the choice of materials which may be employed as friction surfaces with the clutch is much broader, since only the dynamic coefficient of friction (of such materials) need be considered. More consideration therefore can be placed on other parameters of the clutch, such as life, wear rate, unit pressure, area and so on.

Other objects, features and advantages of the invention will become apparent from the following detailed description taken in connection with the accompanying drawings.

DETAILED DESCRIPTION OF THE INVENTION

Figure 1:
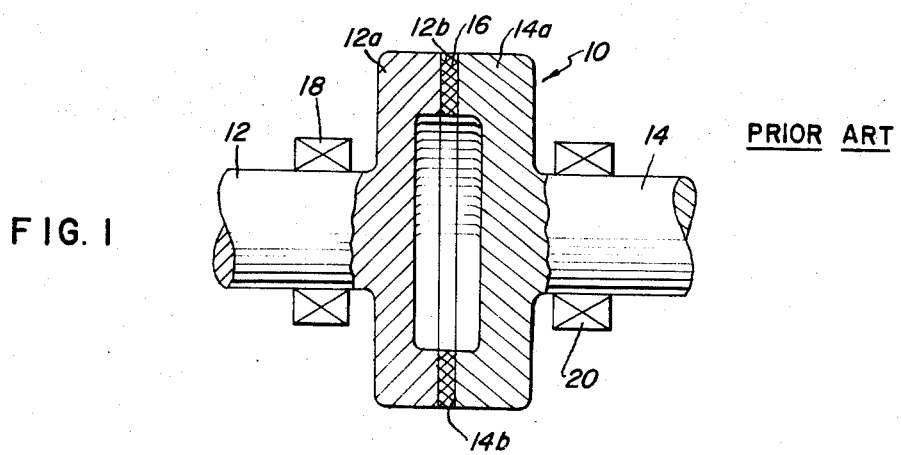
FIG. 1 is an elevational view, partially broken away and in section, of a conventional disc type friction clutch heretofore known in the prior art.

Referring first to FIG. 1, a disc type friction clutch assembly, generally designated 10, as heretofore known in the prior art, is shown to include an input shaft 12 having a clutching disc 12a, and an output shaft 14 having a clutching disc 14a. The adjacent faces of the clutching discs 12a and 14a have friction surfaces 12b and 14b, respectively, which are in engagement or, as shown in the drawings, one of the discs may have a friction clutch pad 16 secured thereto. The input and output shafts 12 and 14, respectively, are mounted by means of bearings 18 and 20, respectively, for rotation about coincidental axes defined by the center lines of the shafts. With the shafts mounted on the same axis of rotation, there is no relative motion between the friction surfaces of the clutching discs 12a, 14a during the running or driving condition of the clutch. The torque limit of the clutch is determined by the static coefficients of friction of the friction clutching surfaces 12b, 14b (or the friction pad 16). As described above, the output torque of the clutch can be made constant only by selecting materials for the friction surfaces or friction pad which have static and dynamic coefficients of friction as nearly equal as possible.

Figure 2:
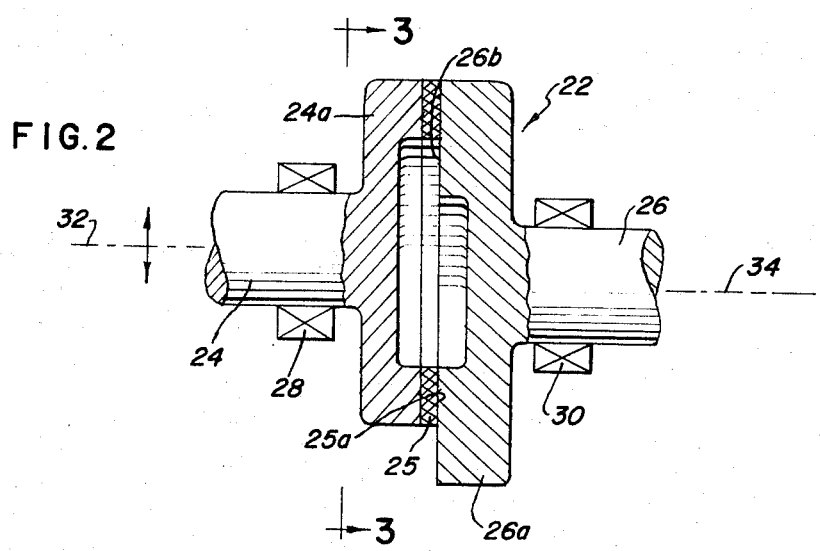
FIG. 2 is an elevational view, partially broken away and in section, of a disc type friction clutch embodying the concepts of the present invention.
Figure 3:
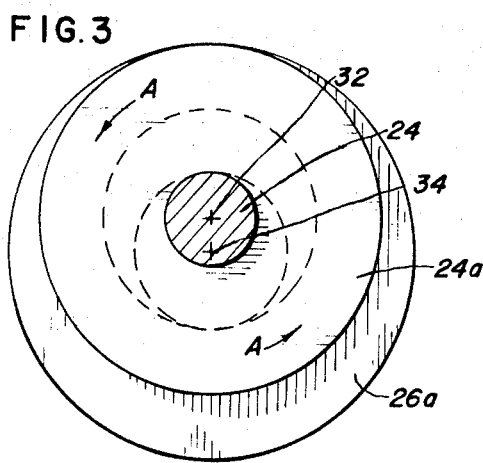
FIG. 3 is a vertical section taken generally along the lines 3—3 of FIG. 2, showing schematically the clutch in its stopped condition (i.e., the torque limit of the clutch is surpassed and no driving condition exists)
Figure 4:
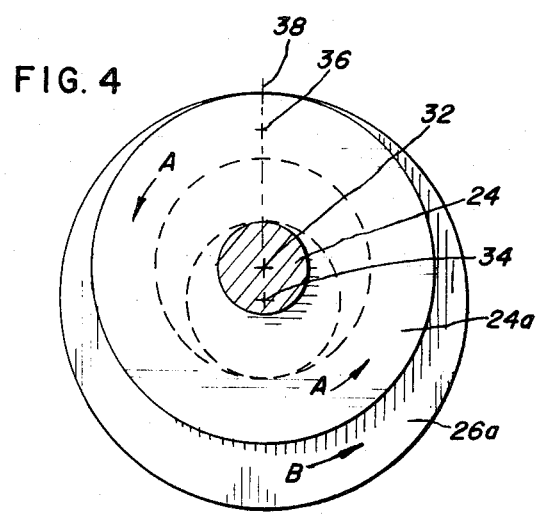
FIG. 4 is a view similar to that of FIG. 3 showing schematically the clutch in its driving condition.

FIGS. 2 through 4 show a disc type friction clutch, generally designated 22, embodying the concepts of the present invention. An input shaft 24 has a clutching disc 24a mounted on the end thereof and extending generally perpendicular to the shaft 24. An output shaft 26 has a clutching disc 26a mounted on an end thereof and extending generally perpendicular to the output shaft 26. The input shaft 24 and output shaft 26 are mounted by means of bearings 28 and 30, respectively, or other suitable means to locate the shafts for operation with their respective driving and driven members. However, as seen in the drawings, the shafts 24 and 26 are mounted for rotation about offset axes 32 and 39 respectively, so that the clutching discs rotate in a nonconcentric relationship. Since the axes of rotation of the shafts 24 and 26 are offset, the friction surface on one of the clutching discs 24a, 26a must be enlarged in order to maintain full face contact with the friction surfaces of the discs. In the embodiment shown in the drawings, the clutching disc 26a is enlarged and has an enlarged friction surface 26b relative to the clutching disc 24a. As shown, the clutching disc 24a has a friction pad 25 mounted thereon, with the friction pad having a friction surface 25a in engagement with the friction surface 26b of the clutching disc 26a. Axis 32 may be made laterally laterally shiftable relative to the axis 34 thereby to vary the eccentricity between the axes and the torque limit of the clutch.

Referring to FIGS. 3 and 4, the axis of rotation of the input shaft 24 is shown by the numberal 32 and the axis of rotation of the output shaft 26 is shown by the numeral 34. FIG. 3 schematically shows the clutch of the present invention wherein the input shaft 24 is rotating as indicated by the arrows A, while the output shaft is stationary. With this "clutched" condition, there is relative motion between the entire friction surface 25a of the friction pad 25 (on clutching disc 24a) and the friction surface 26b of the clutching disc 26a. FIG. 4 schematically shows the clutching mechanism of the present invention with both the input shaft and output shaft rotating, as indicated by the arrows A and B, respectively. Theoretically, for a given clutch and given clutch slip condition there is only one point, as indicated exemplarily by the numeral 36, between the friction surfaces 25a and 26b at the interface therebetween which will have the same relative speed during running condition of the clutch, even though both the input and output shafts are rotating. The point 36 will lie somewhere on the line 38 which is the intersection above the axis 32 between a plane defined by the axes and the interface. At all other points on the two friction surfaces there is a relative motion between the two clutching discs even though the shafts, in effect, are coupled in a driving or running condition. Thus, only the dynamic coefficient of friction between the adjacent friction surfaces is determinative of the torque limit of the clutch.

The foregoing detailed description has been given for clearness of understanding only and no unnecessary limitations should be understood therefrom as some modifications will be obvious to those skilled in the art.

I claim:

1. A slip clutch mechanism comprising, in combination, a rotatable input shaft having an enlarged portion formed on a terminate end thereof, means defining a friction surface on an outer face of the enlarged end portion of the input shaft and extending generally transversely of the input shaft, a rotatable output shaft having an enlarged portion formed on a terminate end thereof adjacent the terminate end of said input shaft, means defining a friction surface on an outer face of the enlarged end portion of the output shaft and extending generally transversely of the output shaft and in engagement with the friction surface on the enlarged terminate end portion of said input shaft, and means mounting said shafts for rotation about offset axes whereby the engaging friction surfaces are constantly in dynamic motion relative to one another when the input shaft is driven and the torque transmitting ability of the clutch is made independent of the static coefficients of friction of the friction surfaces, one of said friction surfaces on one of said shafts being sufficiently larger than the other friction surface on the other shaft so that the other friction surface is maintained in full face contact with said one friction surface during rotation of said shafts.

2. The slip clutch of claim 1 wherein said enlarged portions on the terminate ends of said input and output shafts are formed integrally with the respective shafts.

3. The slip clutch of claim 1 wherein said friction clutching surfaces are generally disc shaped, said one friction surface having a greater diameter than said other friction surface by an amount equal to twice the offset distance between the axes.

* * * * *